J. E. BELL.
SUPERHEATER BOILER.
APPLICATION FILED MAR. 9, 1905.

1,036,517.

Patented Aug. 20, 1912.
6 SHEETS—SHEET 6.

UNITED STATES PATENT OFFICE.

JOHN E. BELL, OF BARBERTON, OHIO, ASSIGNOR TO THE BABCOCK & WILCOX COMPANY, OF NEW YORK, N. Y., A CORPORATION OF NEW JERSEY.

SUPERHEATER-BOILER.

1,036,517.  Specification of Letters Patent.  Patented Aug. 20, 1912.

Application filed March 9, 1905. Serial No. 249,182.

*To all whom it may concern:*

Be it known that I, JOHN E. BELL, of Barberton, Summit county, Ohio, have invented a new and useful Superheater-Boiler, of which the following is a full, clear, and exact description, reference being had to the accompanying drawings, forming part of this specification, in which—

Figure 1:
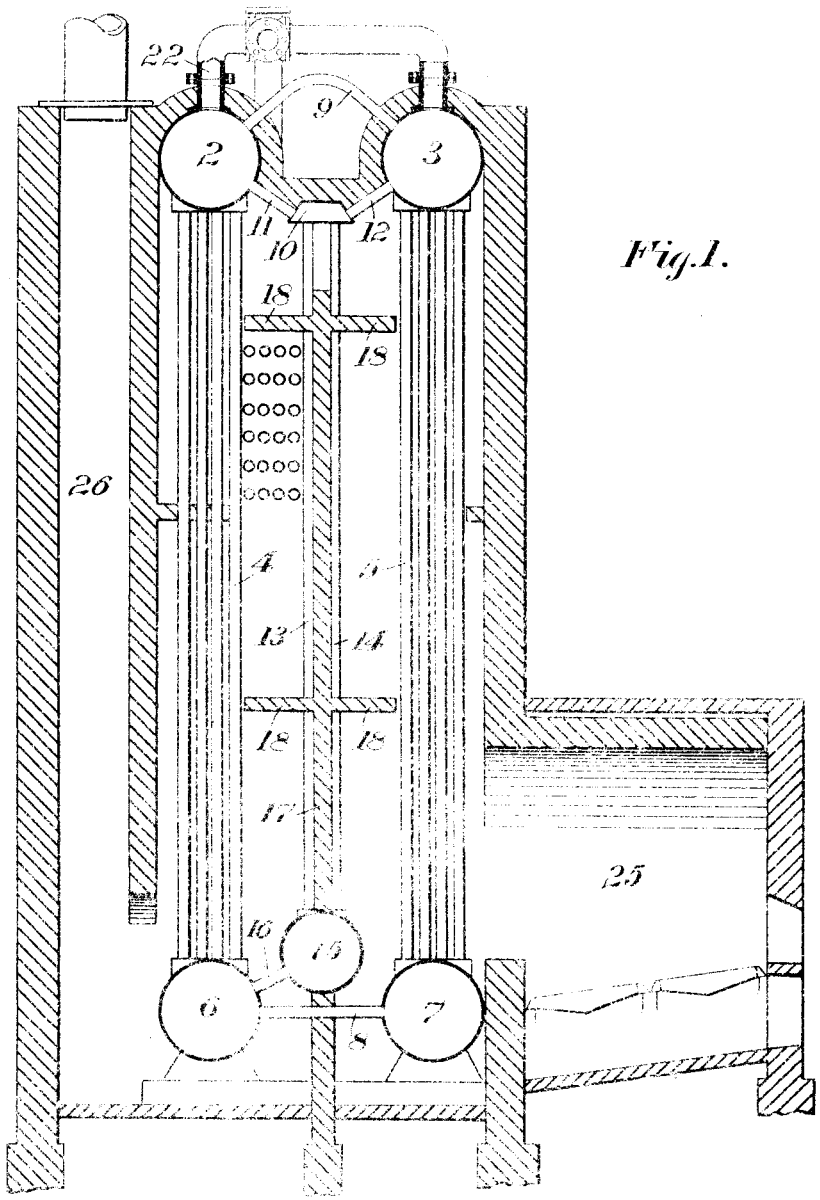
Figure 2:
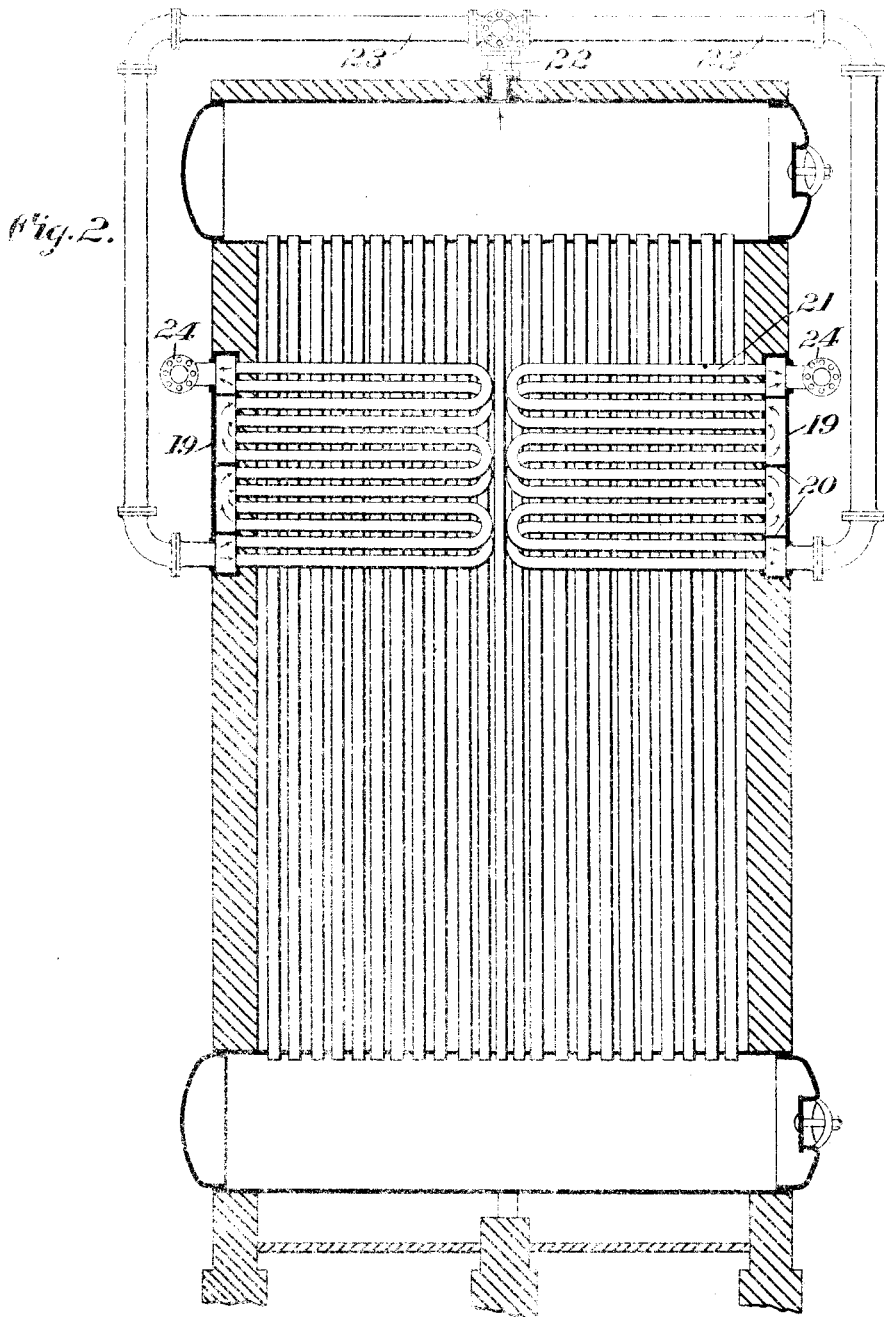
Figure 3:
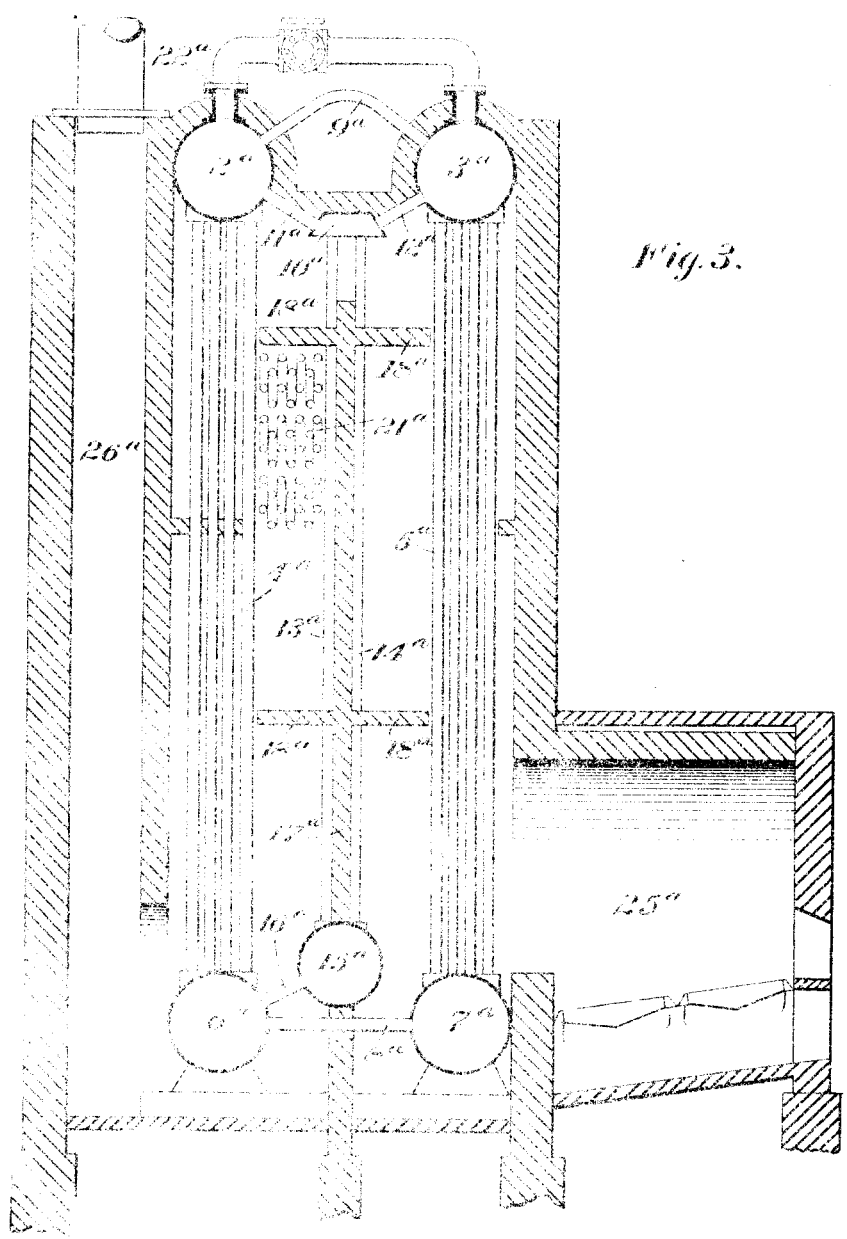
Figure 4:
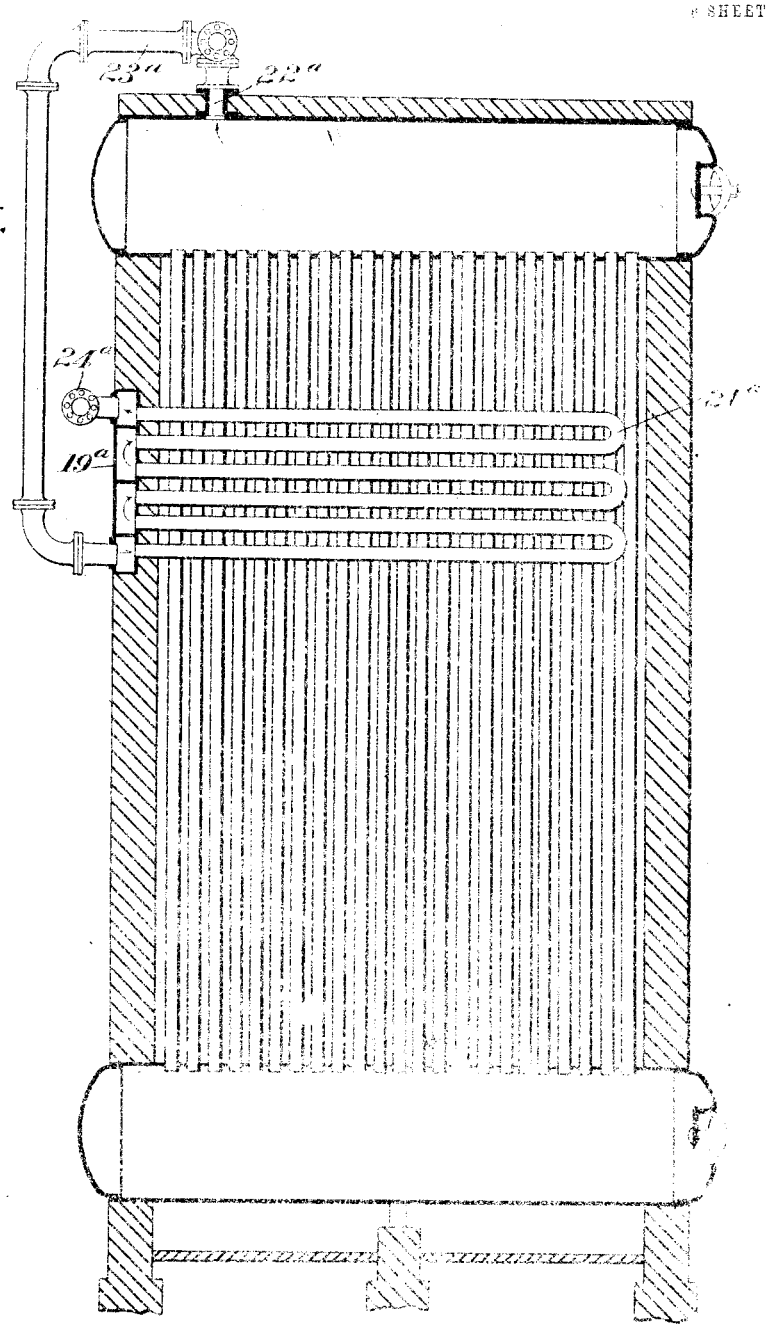
Figure 5:
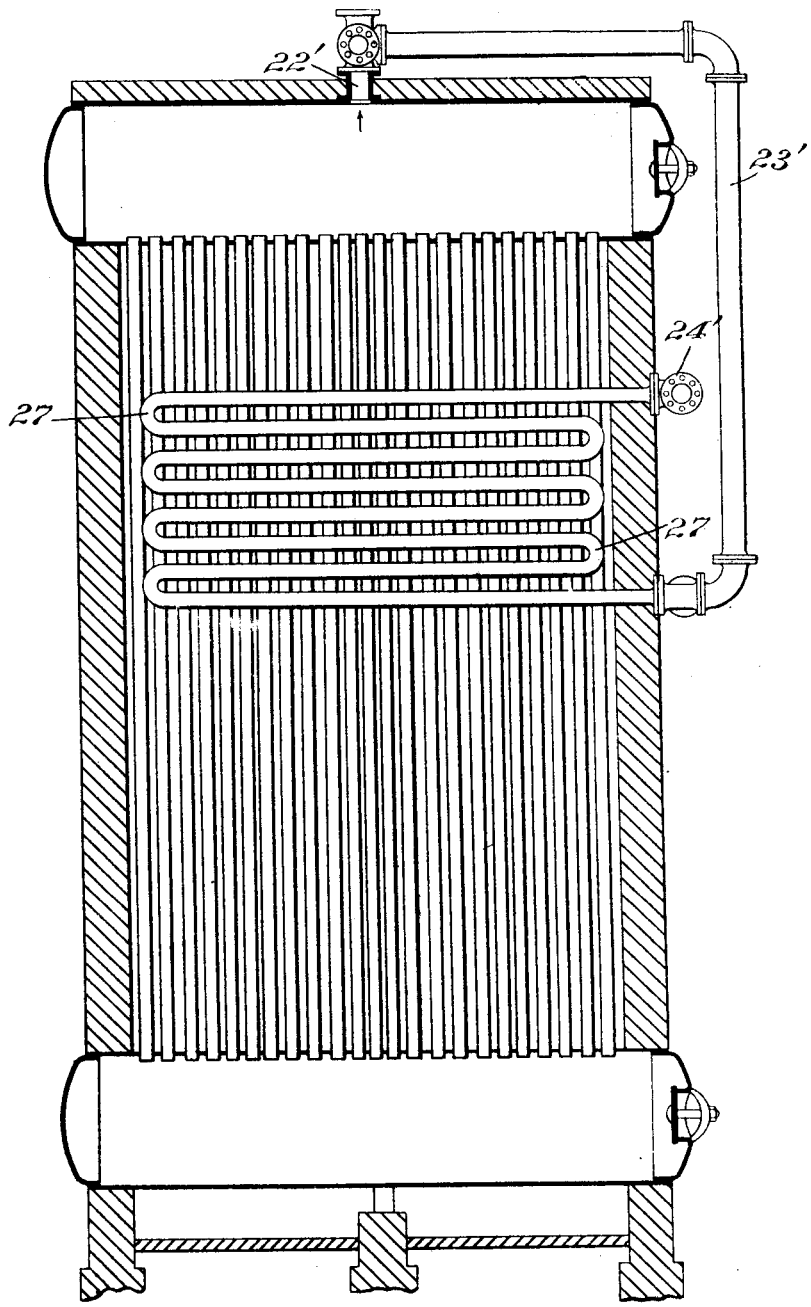
Figure 6:
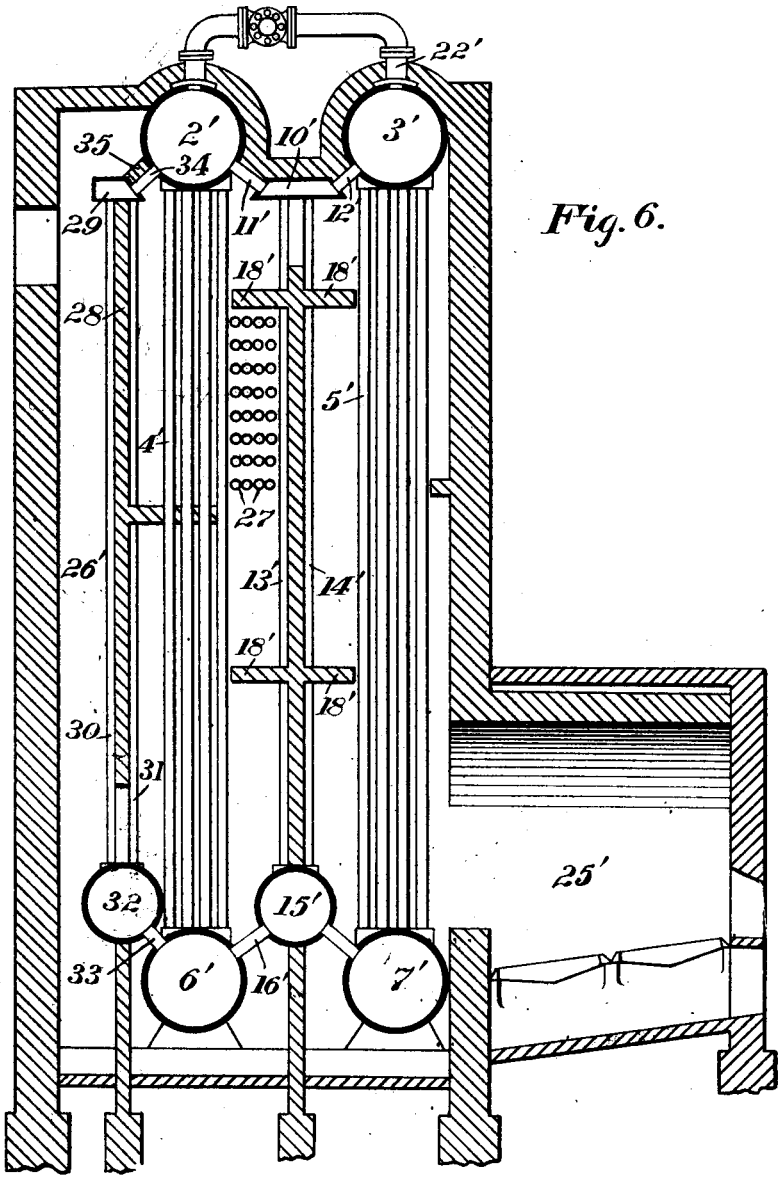

Figure 1 is a vertical longitudinal section of my improved superheater boiler; Fig. 2 is a vertical cross-section showing the superheater; Fig. 3 is a view similar to Fig. 1 showing another form of the invention; Figs. 4 and 5 are vertical cross-sections of Fig. 3 showing right and left hand arrangements of the superheater; and Fig. 6 is a vertical longitudinal section of another form of the invention.

My invention relates to the class of superheater boilers, and is designed to provide a simple and efficient apparatus of this character.

In the drawings, referring to the forms of Figs. 1 and 2, 2 and 3 are upper transverse steam and water drums connected by banks of tubes 4 and 5 with mud drums 6 and 7. The mud drums are connected by pipes 8 and the steam spaces of the upper drums are connected by pipes 9. 10 represents small headers into which the water circulators 11 and 12 lead from the drums 2 and 3, these headers being connected by vertical tubes 13 and 14 with supplemental water drum 15. The drum 15 is connected to one of the mud drums—in the form shown, to the rear mud drum—by pipes 16. A vertical baffle 17 extends from the drum 15 for the major portion of the height of the tubes 13 and 14 and is provided with shelves 18. In the space between the tubes 13 and the bank of tubes 4 I place the superheater, which is preferably of the form with end boxes for reversely bent tubes, though it may be of any desirable form. In the present form, duplicate boxes 19 are set in the opposite side walls, these boxes being provided with different chambers formed by partitions 20. The boxes are provided with the U-shaped tubes 21 which form the superheating surface, these tubes being arranged to give successive back and forth passes through the different chambers of the boxes. The boxes are preferably protected on the inner sides by the refractory side walls, on which they are set. The steam passes from the rear drum 2 through the outlet 22 into the pipes 23, which are connected to the lower compartments of the superheater boxes. The steam thence circulates back and forth until it reaches the upper compartment where it is taken out through a suitable pipe 24. The flame and gases arising from the combustion chamber 25 flow up in front of the baffle, and thence down over the rear set of water tubes and also over the superheater, and then pass to the outlet flue 26.

The form shown in Figs. 3 and 4 is similar to that of Figs. 1 and 2, except that one superheater box 19ª is provided in one side wall, the U-shaped pipes 21ª extending substantially the entire width of the pass. In this form parts similar to those of Figs. 1 and 2 are designated by similar numerals with the letter "a" applied.

The forms shown in Fig. 5 are the same as that shown in Figs. 3 and 4, except that the superheater box is done away with and the superheater consists of an endless pipe 27 reversely bent back and forth and having its upper section connected to the outlet.

The form of Fig. 6 is similar to that of Figs. 1 and 2 except that the baffle in the rear of the rear set of water tubes instead of being a plain wall as in Fig. 1, consists of a baffle support between water tubes. Thus in this figure I show the front wall of the flue 26′ as consisting of a baffle 28 extending down from headers 29 a portion of the length of the two rows of water tubes 30 and 31. These water tubes connect the row of headers 29 to the supplemental water drum 32 which is preferably connected with the drum 6′ by tubes or nipples 33. The headers 29 are connected to the rear upper drum 2′ by the nipples or pipes 34 over which is the partition or baffle 35 to prevent short circuiting of the gases. In this form parts similar to those of Figs. 1 and 2 are designated by similar numerals with the prime mark applied.

The advantages of my invention result from the peculiar location of the superheater in the space between the central baffle and water tubes and the rear bank of tubes. The gases contact with the front bank of tubes before they pass over the superheater and the second bank.

The headers may be replaced by a single transverse drum or header, the tubes 13 and 14 may be extended into either of the mud drums; these tubes may lead directly to the water space of the steam and water drums; and other variations may be made in the form and arrangement of the boiler and superheater without departing from my invention.

I claim:—

1. A water tube boiler comprising a setting, upper and lower transversely disposed drums, a pair of approximately vertical banks of tubes connecting the drums, a baffle between the banks of tubes forming up and down passes for the gases, a superheater having horizontal tubes located in one of said passes between the water tubes therein and the baffle, a horizontal shelf on one side of the water tubes above the superheater, and a second horizontal shelf below the superheater on the other side of the water tubes; substantially as described.

2. A water tube boiler including a setting, a pair of upper steam and water drums and a pair of lower mud drums arranged therein, a pair of banks of tubes connecting said drums, an intermediate baffle arranged between the banks of tubes and provided near its upper portion with approximately horizontal shelves that extend out over the two passes to points adjacent the banks of tubes, an auxiliary shelf extending across the rearmost bank of tubes, and a superheater arranged in the down pass at a point below one of the upper shelves and in a position above the horizontal plane of the auxiliary shelf, the shelves in the last pass being arranged to pass the gases in a zig-zag direction between the water tubes in the last pass and between the tubes of the superheater; substantially as described.

In testimony whereof, I have hereunto set my hand.

JOHN E. BELL.

Witnesses:
J. C. FRANK,
M. E. HAMLIN.